US005469340A

United States Patent [19]

Heizmann

[11] Patent Number: 5,469,340

[45] Date of Patent: Nov. 21, 1995

[54] ILLUMINATION DEVICE FOR VEHICLES

[75] Inventor: Frieder Heizmann, Denens, Switzerland

[73] Assignee: Robert Bosch GmbH, Stuttgart, Germany

[21] Appl. No.: 335,654

[22] Filed: Nov. 8, 1994

Related U.S. Application Data

[63] Continuation of Ser. No. 136,681, Oct. 14, 1993, abandoned.

[30] Foreign Application Priority Data

Nov. 26, 1992 [DE] Germany .......................... 42 37 470.0
Aug. 18, 1993 [DE] Germany .......................... 43 27 690.3

[51] Int. Cl.$^{6}$ ...................................................... B60Q 1/06

[52] U.S. Cl. .............................. 362/66; 362/61; 362/285; 362/418; 362/307; 362/80

[58] Field of Search ................................ 362/61, 307, 66, 362/80, 215, 420, 285, 287, 418, 296, 428

[56] References Cited

U.S. PATENT DOCUMENTS

| | | | |
|---|---|---|---|
| 1,954,806 | 4/1934 | Falge et al. | 362/215 X |
| 1,987,697 | 1/1935 | Mead et al. | 362/215 |
| 2,131,634 | 9/1938 | Michel et al. | 362/225 |
| 4,875,141 | 10/1989 | Miyauchi et al. | 362/62 X |
| 4,924,359 | 5/1990 | Lindac et al. | 362/80 |

FOREIGN PATENT DOCUMENTS

| | | | |
|---|---|---|---|
| 1597977 | 8/1970 | Germany | 362/61 |
| 571766 | 1/1958 | Italy | 362/61 |
| 636773 | 8/1962 | Italy | 362/80 |

*Primary Examiner*—Ira S. Lazarus
*Assistant Examiner*—Thomas M. Sember
*Attorney, Agent, or Firm*—Michael J. Striker

[57] ABSTRACT

An illumination device for vehicles has at least two headlights arranged on a front side of a vehicle and radiating different light beams having at least an upper bright-dark limit so that a headlight arranged on a vehicle side facing away from an opposite traffic side radiates a horizontally dispersed light beam which has a substantially horizontal upper bright-dark limit and illuminates at least the opposite traffic side, while another headlight arranged on a vehicle side facing the opposite traffic side radiates a light beam which illuminates a traffic side and an edge region outwardly adjoining the traffic side and has an upper bright-dark limit with at least a portion which is higher than the bright-dark limit of the light beam radiated by the first-mentioned headlight.

9 Claims, 2 Drawing Sheets

ILLUMINATION DEVICE FOR VEHICLES

This is a continuation of application Ser. No. 08/136,681 filed Oct. 14, 1993, now abandoned.

BACKGROUND OF THE INVENTION

The present invention relates to an illumination device for vehicles.

In particular, it relates to an illumination device which has at least two headlights arranged at the front side of the vehicle and radiating different light beams each having at least an upper bright-dark limit.

Such an illumination device is disclosed, for example, in the German document DE-A 15 97 977. This illumination device has several headlights arranged on the front side of the vehicle and radiating light beams which illuminate the region in front of the vehicle in different ways. Some headlights produce a base light beam which is symmetrical and has a horizontal upper bright-dark limit so that dazzling of the opposite traffic is prevented. Further, a headlight for radiating a highway auxiliary light and a headlight for radiating an expressway auxiliary light are provided, which are operated selectively and radiate a light beam with an upper bright-dark limit which rises toward a roadway edge of the traffic side. The dazzling of the counter traffic due to reflection of the light emitted by the headlight from the roadway upper surface occurs especially when the roadway is wet. This dazzling endangers the opposite traffic and must be avoided.

It is also known to provide an inclination adjustment with an adjusting device in the anti-dazzle headlights of vehicles, for constantly maintaining the orientation of the light beam radiated by the anti-dazzle headlight independently of the loading of the vehicle and therefore for avoiding dazzling of the opposite traffic by the loaded vehicle. Since conventionally, both anti-dazzle headlights of the vehicle radiate identical light beams and illuminate both the traffic side and the opposite traffic side, it is necessary to provide for both anti-dazzle headlights a separate adjusting device, which of course involves high expenses.

SUMMARY OF THE INVENTION

Accordingly, it is an object of the present invention to provide an illumination device for vehicles which avoids the disadvantages of the prior art.

In keeping with these objects and with others which will become apparent hereinafter, one feature of the present invention resides, briefly stated, in an illumination device for motor vehicles provided with at least two headlights arranged on a front side of the motor vehicle and radiating different light beams, each having an upper bright-dark limit, wherein in accordance with the present invention, a headlight arranged on the vehicle side which faces away from the opposite traffic side radiates a horizontally dissipated light bundle which has a substantially horizontal upper bright-dark limit and illuminates at least the opposite traffic side, while a headlight arranged on the vehicle side facing the opposite traffic side radiates a light beam which illuminates the traffic side and an edge region outwardly adjoining the traffic side and has an upper bright-dark limit which at least by portions is higher than the bright-dark limit of the light beam radiated by the first mentioned headlight.

When the illumination device is designed in accordance with the present invention, the light beam radiated by the headlight facing away from the opposite traffic illuminates the roadway in front of the vehicle only a little and thereby only a little light can be reflected by a wet roadway which dazzles the opposite traffic. Also, the light beam radiated by the headlight facing the opposite traffic illuminates only the traffic side and is reflected from a wet roadway only a little so that it cannot dazzle the opposite traffic.

In accordance with another feature of the present invention, the light beam radiated by the headlight which is arranged on the vehicle side facing away from the opposite traffic side has a lower, substantially horizontal bright-dark limit, and the region located underneath this bright-dark limit in front of the vehicle is not illuminated by the light beam or is illuminated at least with a lower illumination intensity than the region located above the bright-dark limit. In this construction the overlapping of both light beams provides for good illumination of the traffic side.

In accordance with another feature of the present invention, the headlight arranged on the vehicle side facing away from the opposite traffic side has an inclination which is adjustable by an adjusting device. In such a construction, in order to avoid dazzling of the opposite traffic by the loaded vehicle, only the headlight which illuminates the opposite traffic side has an adjustable inclination, so that for the vehicle only one adjusting device is needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
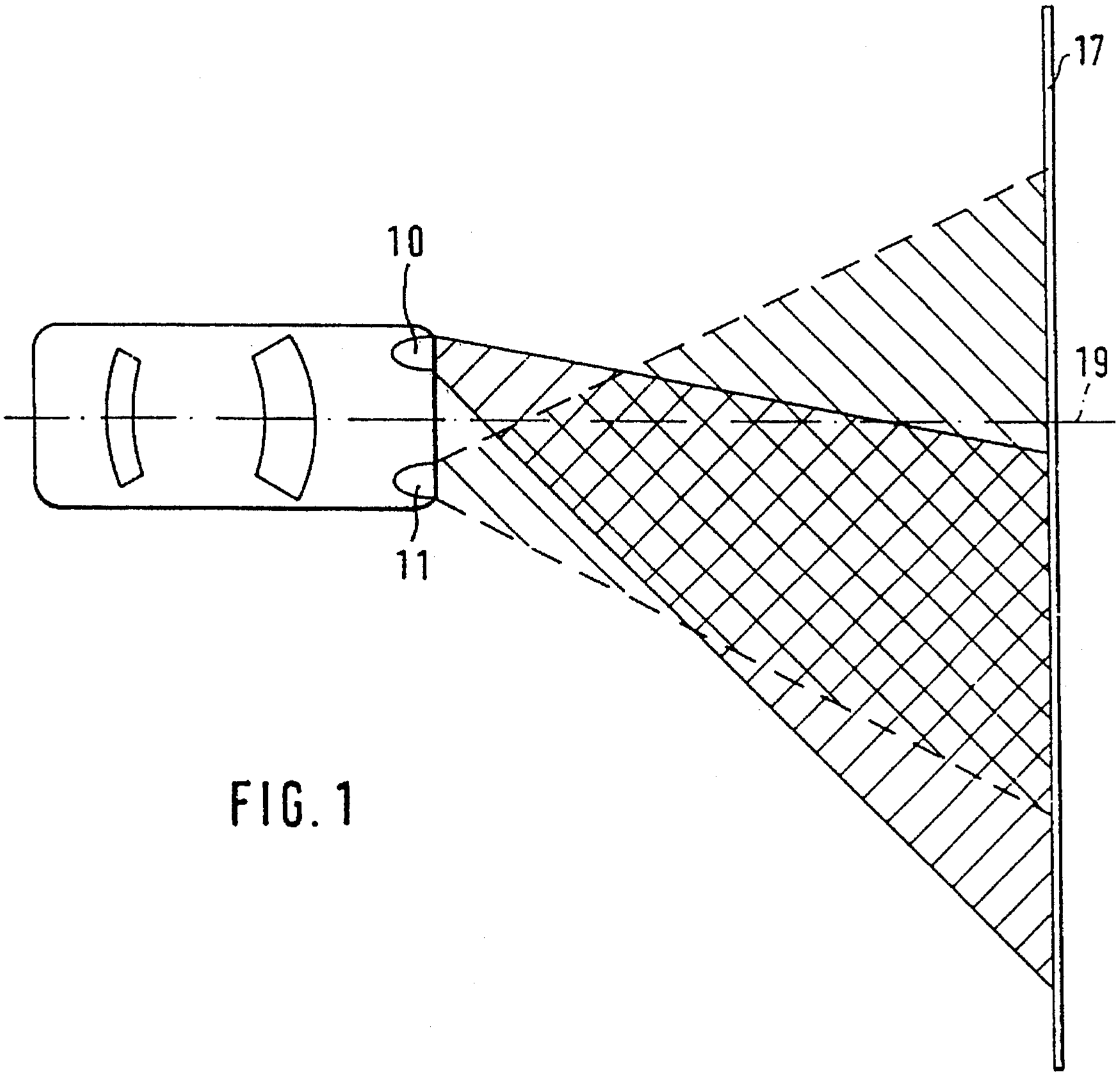
FIG. 1 is a view showing a vehicle from above.

A vehicle shown in FIG. 1 has an illumination device which includes at least two headlights 10 and 11 arranged on the front side of the vehicle. The headlight 10 is arranged at the left side of the vehicle and the headlight 11 is arranged at the right side of the vehicle as considered in a traveling direction. The vehicle is made for right-side oriented traffic. The headlights 10 and 11 are anti-dazzle headlights, while additional high beamlights on the vehicle are not illustrated.

Figure 2:
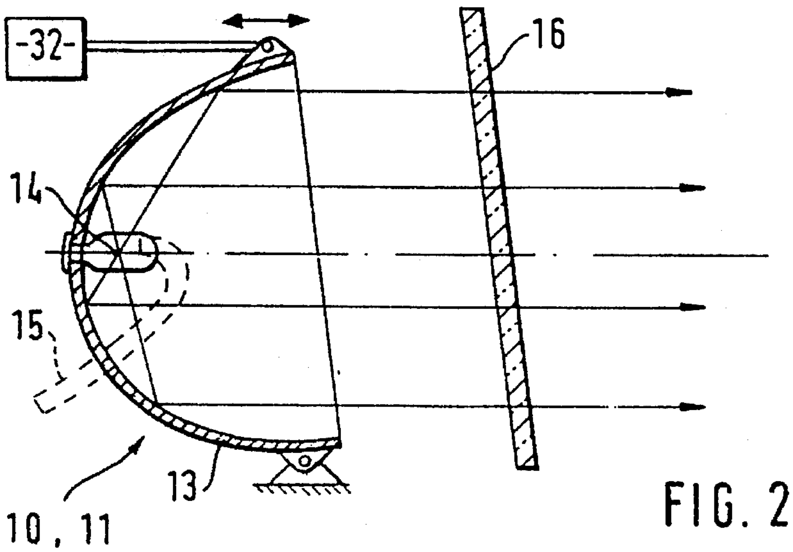
FIG. 2 is a view showing a headlight of the vehicle in accordance with the present invention in a section.

Each of the headlights 10 and 11, as shown in FIG. 2, has a reflector 13, a light source 14 and a light disk 16. The light source 14 can be an incandescent lamp or a gas discharge lamp. The light disk 16 can be formed as a clear disk without profiling or a disk provided with optical elements for influencing the light reflected by the reflector 13, for example, for dispersing and/or deviating the light. Instead of a light source 14, the headlights 10 and 11 can be provided with a light conductor 15 identified by a broken line in FIG. 2, so that the headlights are connected by the light conductor with an external light source.

Figure 3:
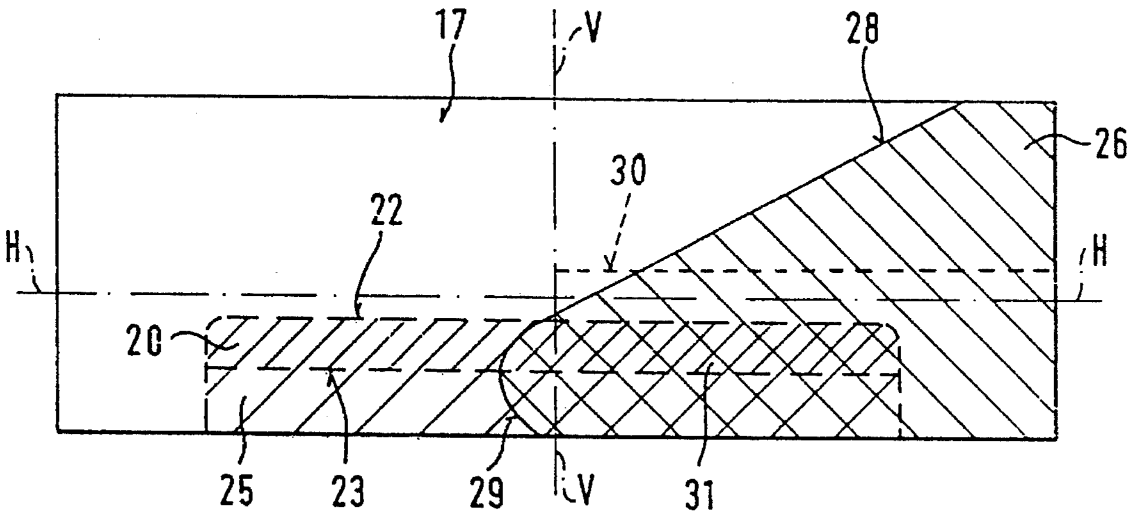
FIG. 3 is a view showing regions which are illuminated on a measuring screen by the headlights of the vehicle in accordance with the present invention.

FIG. 3 shows a measuring screen 17 which is arranged at a distance from the vehicle perpendicular to a vehicle longitudinal axis 19. A vertical central plane VV and a horizontal central plane HH are shown on the measuring screen 17. The measuring screen 17 represents a roadway located in front of the vehicle. With right-side oriented traffic, the opposite traffic side is located at the left of the vertical central plane VV and the traffic side is located at the right.

The right headlight 11 radiates during its operation a horizontally dispersed light bundle which illuminates the measuring screen 17 in the region 20 located under the horizontal central plane HH and at both sides of the vertical central plane VV, or in other words, the opposite traffic side and the traffic side proper. The region 20 illuminated by the light beam of the right headlight 11 is limited from above by a horizontal bright-dark limit 22. A further bright-dark limit 23 limits the region 20 from below and is arranged also horizontally. The region 25 of the measuring screen 17 which is located under the lower bright-dark limit 23 is not illuminated by the right headlight 11 at all or illuminated at least with an illumination intensity which is substantially lower than the region 20. The close region in front of the vehicle, which corresponds to the region 25 of the measuring screen 17 located under the bright-dark limit 23, is not illuminated by the right headlight or illuminated only weakly. The illumination intensity in the region 25 is adjusted in correspondence with the legally prescribed values, or in other words, in accordance with an average illumination described for the region 25. Alternatively, in the above-described manner, only the region at the left side of the vertical central plane VV can be illuminated by the right headlight 11, while the region at the right of the central plane VV remains not illuminated by the headlight 11.

The left headlight 10 radiates a light beam which illuminates the measuring screen 17 in the region identified as 26 in FIG. 3 and located substantially only at the right of the vertical central plane VV. The region 26 is limited from above by a bright-dark limit 28 which in this embodiment extends so that it rises toward the right edge of the measuring screen 17. The region 26 can be, however, also limited from above by a horizontal bright-dark limit 30 which is identified by a broken line in FIG. 3 and is arranged higher than the bright-dark limit 22 of the region 20. At the left side the region 26 is limited by a lateral bright-dark limit 29. It is located in the region 20 illuminated by the right headlight 11, or in other words, under the bright-dark limit 22. With the horizontal upper bright-dark limit 30, the lateral bright-dark limit 29 extends upwardly over, through and beyond the bright-dark limit 22 of the region 20. The lateral bright-dark limit 29 as shown in FIG. 3 can be curved or rectilinear, perpendicular or inclined, and is arranged substantially in the region of the vertical central plane VV or somewhat offset toward the opposite traffic side relative to the vertical central plane. The rising bright-dark limit 28 extends to the upper bright-dark limit 22 of the region 20 illuminated by the right headlight 11. The light beam radiated by the left headlight 10 illuminates the traffic side in the close and far region as well as its outer edge region, while the opposite traffic side is not illuminated by the this light beam.

During simultaneous operation of both headlights 10 and 11, the measuring screen 17 is illuminated with an asymmetrical light beam which is known as an anti-dazzle light. At the opposite traffic side, the region illuminated on the measuring screen 17 is limited by the upper bright-dark limit 22 of the region 20, and at the traffic side it is limited by the rising bright-dark limit 28 or alternatively the horizontal bright-dark limit 30 of the region 26. The above-presented description relates to right-side oriented traffic, and therefore it is believed to be clear that for the left-side oriented traffic it is correspondingly reversed. In other words, the right headlight 11 illuminates the measuring screen 17 exclusively at the left of the vertical central plane VV in the way illuminated by the left headlight in accordance with the above description, while the left headlight 10 illuminates the measuring screen 17 in the region 20.

When the region 20 illuminated by the right headlight 11 extends as shown in FIG. 3 at both sides of the vertical central plane VV, then in a region identified with reference numeral 31, it overlaps at the traffic side with the region 26 illuminated by the left headlight 10. The region 31 is illuminated thereby with a higher illumination intensity, so that the traffic side is illuminated especially intensely.

Since the light beam radiated by the left headlight 10 illuminates exclusively the traffic side, the right beam is not reflected from a wet roadway so that a dazzling of the oppositely approaching vehicle driver is caused by it. Since the light beam radiated by the right headlight 11 does not illuminate the roadway in the close region in the front of the vehicle or illuminates it only weakly, this leads during reflection on a wet roadway to little dazzling of an oppositely approaching vehicle driver.

For producing the light beam required for illumination of the measuring screen 17 in the above-described way, the reflectors 13 of the headlights 10 and 11 can be designed so that they reflect the light radiated by the light source 14 and correspondingly the light source 15 so as to produce the light beam. Alternatively, each light beam can be produced by optically active elements on the light disk 16 from the light reflected by the reflector 13.

The above-described illumination device can be provided in accordance with a further embodiment of the invention, with an adjusting device 32 illustrated in FIG. 2. The adjusting device 32 can adjust the headlight 11 which illuminates the opposite traffic side, with respect to its inclination. The adjusting device 32 can increase the inclination of the headlight 11 to the roadway, starting from a value for an unloaded vehicle, so that the upper bright-dark limit 22 of the light beam radiated by this headlight can assume also for a loaded vehicle the position required for eliminating a dazzling of the opposite traffic. It is also possible that the adjusting device 32 can adjust the whole headlight 11 or only its reflector 13. The adjusting device 32 can be operated automatically. In this case a control device is provided, which detects the loading of the vehicle and sets the adjusting device in operation when an adjustment of the headlight 11 is required to avoid dazzling the opposite traffic. It is also possible to provide the adjusting device which is manually actuatable by a driver of a vehicle. The adjusting device 32 can be operated by an electric motor, hydraulically or pneumatically. Since the other headlight 10 illuminates only the traffic side, no adjusting device is needed for it.

It will be understood that each of the elements described above, or two or more together, may also find a useful application in other types of constructions differing from the types described above.

While the invention has been illustrated and described as embodied in an illumination device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An illumination device for vehicles, comprising at least two headlights arranged on a front side of a vehicle and radiating different light beams having at least an upper bright-dark limit, said headlights being arranged so that a headlight arranged on a vehicle side facing away from an opposite traffic side radiates a horizontally dispersed light beam which has a substantially horizontal upper bright-dark limit and illuminates at least the opposite traffic side, while another headlight arranged on a vehicle side facing the opposite traffic side radiates a light beam which illuminates only a traffic side and an edge region outwardly adjoining the traffic side and has an upper bright-dark limit with at least a portion which is higher than said bright-dark limit of said light beam radiated by said headlight arranged on a vehicle side facing away from an opposite traffic side, said headlights being arranged so that said light beam radiated by said headlight arranged at the vehicle side facing away from the opposite traffic side has a lower substantially horizontal bright-dark limit, and said light beam radiated by said headlight arranged at the vehicle side facing the opposite traffic side also has a lower substantially horizontal bright-dark limit arranged so that said lower substantially horizontal bright-dark limit produced by said light beam from said headlight arranged on a vehicle side facing away from an opposite traffic side is located higher than said lower substantially horizontal bright-dark limit produced by said light beam of said headlight arranged on a vehicle side facing the opposite traffic side, and a region in front of the vehicle located under said lower substantially horizontal bright-dark limit being illuminated with at least a lower light intensity than a region located above said lower substantially horizontal bright-dark limit.

2. An illumination device as defined in claim 1, wherein said headlights are arranged so that said light beam radiated by said headlight which is arranged at the vehicle side facing away from the opposite traffic side, illuminates the opposite traffic side and the traffic side, while the traffic side is illuminated by said light beam of both said headlights.

3. An illumination device as defined in claim 1, wherein said headlights are arranged so that said light beam which is radiated by said headlight arranged at the vehicle side facing the opposite traffic side has a lateral bright-dark limit with respect to the opposite traffic side.

4. An illumination device as defined in claim 1, wherein said region in front of the vehicle located under said lower substantially horizontal bright-dark limit is not illuminated at all.

5. An illumination device as defined in claim 1, wherein said headlights are arranged so that the upper bright-dark limit of the light beam illuminating only the traffic side rises starting from said upper bright-dark limit of another of said light beams toward an outer edge region of said traffic side.

6. An illumination device as defined in claim 1, wherein said upper bright-dark limit of said light beam illuminating only said traffic side is substantially horizontal and is arranged higher relative to said upper bright-dark limit of another of said light beams.

7. An illumination device as defined in claim 1, wherein said headlight which is arranged on the vehicle side facing away from the opposite traffic side has an adjustable inclination.

8. An illumination device as defined in claim 7; and further comprising means for adjusting the inclination of said headlight which is arranged at the vehicle side facing away from said opposite traffic side.

9. A vehicle, comprising a vehicle part; and an illumination device attached to said vehicle part, said illumination device including at least two headlights arranged on a front side of a vehicle and radiating different light beams having at least an upper bright-dark limit, said headlights being arranged so that a headlight arranged on a vehicle side facing away from an opposite traffic side radiates a horizontally dispersed light beam which has a substantially horizontal upper bright-dark limit and illuminates at least the opposite traffic side, while another headlight arranged on a vehicle side facing the opposite traffic side radiates a lightbeam which illuminates a traffic side and an edge region outwardly adjoining the traffic side and has an upper bright-dark limit with at least a portion which is higher than said bright-dark limit of said light beam radiated by said first-mentioned headlight, said headlights being arranged so that they radiate light beams having substantially horizontal lower bright-dark limits arranged so that said lower bright-dark limit of said light beam radiated by said headlight arranged on a vehicle side facing away from an opposite traffic side is located higher than said lower bright-dark limit of said light beam radiated by said headlight arranged on a vehicle side facing an opposite traffic side.

* * * * *